UNITED STATES PATENT OFFICE.

FREDERICK OLDFIELD WARD, OF LONDON, ENGLAND.

PROCESS OF LIBERATING POTASH OR SODA FROM ALKALINE SILICATES.

Specification forming part of Letters Patent No. 46,979, dated March 21, 1865.

*To all whom it may concern:*

Be it known that I, FREDERICK OLDFIELD WARD, of Hertford Street, Mayfair, London, in the county of Middlesex, England, have invented improvements in liberating or producing potash or soda (or both, as the case may be) from natural alkaliferous silicates, the residuum of the process being available as a material for manure, pozzuolana, or hydraulic cement; and I hereby declare that the following is a verbatim copy of the specification of my English patent for the said invention and a full and exact description thereof.

This invention has for its principal object the liberation of potash from potash-feldspar (orthoclase) and from the alkaliferous of the feldspathic rocks. It is also applicable to liberate soda from soda-feldspar, (albite,) potash and soda from pumice and lava, and generally to liberate the alkaline bases of such natural alkaliferous silicates as may prove rich enough to pay the costs of the treatment.

The principal novelty of the invention consists in the employment of fluoride of calcium (fluorspar) to assist in effecting the above objects. The fluoride of calcium is employed in conjunction with an earthy material capable of decomposing alkaline silicates and fluosilicates, and for this purpose lime or its carbonate, or a mixture of the two, is preferred. This is believed to be a novel combination.

The mode of operating is very simple. The natural silicate to be treated, the fluoride of calcium, and the earthy material are pulverized and mixed in due proportion, the earthy material being in excess of the silicate, and this again in excess of the fluoride of calcium. The mixture is fritted at a proper heat, preferably in a reverberatory furnace, care being taken to stir it during the process. The frit thus obtained yields caustic potash or soda, or both, in greater or less abundance (according to the nature of the natural alkaliferous silicate treated) when lixiviated, boiled, digested, or macerated, or otherwise suitably treated with water to dissolve out its soluble contents. The alkaline solution thus obtained from the frit may either be used directly in the arts, or its alkaline contents may be separated in the solid form, either as caustic alkali or as carbonate or other salt, at choice, by the usual means. The frit as it comes from the furnace is an alkaline fertilizer of very superior quality, and the residuum left after treatment of the frit by water still retains considerable fertilizing properties. This residuum, when lightly calcined, makes an excellent pozzuolana material, and may also be employed with advantage in the manufacture of hydraulic cement; and in order that the nature of this invention and the best means of performing it with which I am acquainted may be fully made known and declared, I would observe, with reference to the choice of an earthy material or materials capable of decomposing alkaline silicates and fluosilicates by the mode of operating described, that carbonate of lime is, on the whole, to be preferred, the ordinary or the magnesian carbonate of lime being selected, according to local and other circumstances.

In determining the proportions of earthy material to be added to any given silicate or mixture of silicates to be treated, regard is to be had to their composition, and so much earthy material should be supplied that each equivalent of alumina and each equivalent of silica in the mass treated may be provided with three equivalents, or thereabout, of earthy base, including as well the proportion of earthy base contained in the alkaliferous mass treated as the proportion furnished by the earthy material added.

In some cases the quality of the residuum of the operation may be improved as a cement material, by the addition of a proportion of aluminiferous material, preferably of clay rich in alumina. Such addition is particularly useful when the material treated is poor in alumina or of a quartzy nature. As much clay may be added as will bring up the proportion of alumina in the residuum to about half as much, by weight, as the proportion of silica therein. In some cases the clay may be added, together with the earthy material, before fritting the mass, so that the whole may be fritted together. In other cases the clay may be added to the mass, but a residuum left after treatment of the frit by water. In all cases the clay should be well and uniformly mixed with the other ingredients, so as to make a homogeneous product, and whenever clay is used care should be taken to add an earthy material, also in the proportion already mentioned as answering best—that is to say, such proportion as that the whole of the silica and alumina present, including the silica and alumina contained in the clay, may be supplied, with enough earthy base to render them tribasic, or thereabout.

The proportion of fluoride of calcium employed may vary considerably; but seven or eight parts, by weight, in each hundred parts of the mixed mass answer very well, and this proportion is recommended for ordinary cases.

The material should be finely ground and intimately and uniformly mixed by the usual means, then exposed—preferably in a reverberatory furnace—to such heat, moderated by the fluoride employed, and ranging usually from red to bright red, as will cause the ingredient to partially fuse and agglutinate, or, as it is termed, "frit together," sufficiently to bring about their chemical reaction on each other—an effect which may be prevented by stirring them, and is usually accomplished in from half an hour to an hour's time. The firing should, however, still be continued, though may usually be reduced with advantage until all or nearly all the carbonic acid present is drawn off, as well as any water that may be present. This may be easily ascertained by trying from time to time whether a portion of the frit will or will not effervesce with sulphuric or hydrochloric acid. The working character of the calcined product or frit thus obtained, and that by which it is distinguished from the products of former fritting processes for the liberation of alkali from natural alkaliferous silicates, consists in its containing, along with alkali, a proportion of fluorine. The treatment with water, as herein indicated, of such product or frit so characterized in order to extract therefrom the alkaline matter is believed to be novel. The method of aqueous extraction recommended in preference is the mode well-known and commonly practiced by chemical manufacturers as "methodical lixiviation in boiling water"—a system too well understood to need detailed description here. It may suffice to observe that by this system the water is made to pass in succession over less and less exhausted portions of the calcined product or frit, so as to become richer in alkali as it proceeds, till it finally washes a quite fresh portion of frit, and flows away as nearly saturated as may be. The extraction of the alkali from the frit by means of water may advantageously be continued to the point at which, if longer persisted in, the water would begin to dissolve sensible quantities of lime. This may be readily determined by testing the lye for lime at intervals in the usual way, preferably with neutral oxalate of potash.

The crude alkaline lye thus obtained is pure enough to answer for many of the purposes for which an alkaline lye is required. It may be easily freed by subsidence or filtration from any insoluble earthy matter which it may hold in suspension; and if, as often happens, it is colored by dissolved manganic acid or by peroxide of iron, these impurities may be readily deoxidized and thrown down by the addition of a little organic matter. The lye, when evaporated to dryness, yields abundance of crude hydrated alkali containing a variable percentage of silica, usually about twenty-five per cent., by weight, but otherwise of remarkable purity. To the glass-manufacturer, and in many cases to the soap-manufacturer, the presence of the silica is not objectionable; but the silica may be readily precipitated by passing a current of carbonic acid through the lye, which, if then cleared of the silicious precipitate by subsidence or filtration in the usual way, will yield carbonated alkali of remarkable purity. If any salt other than the carbonate be required, the corresponding acid may be substituted for the carbonic acid. The working character of the insoluble residuum thus obtained, and that by which it is distinguished from the insoluble residue of other processes for the extraction of alkali from natural alkaliferous silicates, consists in its containing a proportion of fluorine in combination. The application of residuum thus characterized, obtained when extracting alkali from natural alkaliferous silicates, to the manufacture of manure, hydraulic cement, and pozzuolana, as herein indicated, is believed to be novel. For application as manure such residuum may be dried and used, (as also may the frit itself,) either alone or in admixture with phosphate and nitrogenous ingredients, to form an artificial fertilizing compost, as is well understood. For conversion into hydraulic cement such residuum may be recalcined to drive off water of hydration, and also in some cases to expel carbonic acid; and the product of recalcination, if not already fine enough, may be ground and sifted as in the case of ordinary cement. To convert the residuum into pozzuolana, which only differs from cement in its more argillaceous quality, a silicate of alumina, preferably burnt clay, may be added thereto; or the clay may be burned therewith in such quantity that the total amount of silica and alumina in the mixed product may bear to the total amount of earthy base therein a ratio or proportion ranging between seventy to thirty and ninety to ten, the mean being eighty to twenty, by weight.

Having thus fully described the nature of this invention and the best means which experiment has hitherto suggested for carrying it into effect, I would observe that I am aware that it has been proposed to heat natural alkaliferous silicates with lime in order to liberate alkali therefrom; also, that it has been proposed to employ phosphates, sulphates, and chlorides to facilitate the liberation of alkali by fire from natural alkaliferous silicates. The exposure of such silicates to the prolonged action of watery moisture and to the prolonged action of fermenting organic matter are other methods which I am aware have been proposed with a similar view. From these modes the present invention differs essentially; and as it may be substantially practiced without adher- ing to the precise details of temperature, time, proportion, manipulation, and the like, above indicated as preferable, I proceed in conclusion to define it by the following claims:

1. The mode of producing or liberating potash or soda, or both, as the case may be, from natural alkaliferous silicates, substantially as hereinbefore described.

2. The employment of fluoride of calcium, in conjunction with earthy material or mixture of earthy material, to act with the aid of heat on natural alkaliferous silicates so as to produce or liberate therefrom potash or soda, or both, as the case may be, substantially as hereinbefore described.

3. The extraction by water of the soluble alkaline contents of calcined product or frit obtained when liberating alkali from alkaliferous silicates, and distinguished by the double character that it contains both alkaline matter and fluorine.

4. The application of insoluble residuum obtained when liberating alkali from alkaliferous silicates, and characterized by its containing as one of its ingredients fluorine, in the manufacture of manure, of hydraulic cement, or of pozzuolana, at the operator's choice, substantially as hereinbefore described.

FREDERICK OLDFIELD WARD.

Witnesses:
   B. F. STEVENS,
17 *Henriett Street, Covent Carden, W. C. London.*
   C. SAFFERY,
12 *Darnley Road, Hackney, N. E. London.*